US009673985B2

(12) United States Patent
Mangalampalli et al.

(10) Patent No.: US 9,673,985 B2
(45) Date of Patent: *Jun. 6, 2017

(54) APPARATUS AND METHOD TO PROTECT DIGITAL CONTENT

(71) Applicant: Intel Corporation, Santa Clara, CA (US)

(72) Inventors: Jayant Mangalampalli, Portland, OR (US); Rajesh P. Banginwar, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/178,780

(22) Filed: Jun. 10, 2016

(65) Prior Publication Data
US 2016/0285637 A1 Sep. 29, 2016

Related U.S. Application Data

(63) Continuation of application No. 13/833,119, filed on Mar. 15, 2013, now Pat. No. 9,411,983.

(51) Int. Cl.
G06F 9/30 (2006.01)
H04L 9/32 (2006.01)
(Continued)

(52) U.S. Cl.
CPC ........ *H04L 9/3247* (2013.01); *G06F 12/1408* (2013.01); *G06F 21/10* (2013.01); *G06F 21/64* (2013.01); *G06F 2212/1052* (2013.01)

(58) Field of Classification Search
CPC .................................................. H04L 49/9094
See application file for complete search history.

(56) References Cited

U.S. PATENT DOCUMENTS 6,026,478 A  2/2000 Dowling
6,646,646 B2  11/2003 Peterson
(Continued)

FOREIGN PATENT DOCUMENTS

CN  101185067  5/2008
CN  101901129  12/2010

OTHER PUBLICATIONS

State Intellectual Property Office of The People's Republic of China, First Office Action mailed Jul. 15, 2016 in Chinese Patent Application No. 201410095760.5.
(Continued)

Primary Examiner — Josnel Jeudy
(74) Attorney, Agent, or Firm — Trop, Pruner & Hu, P.C.

(57) ABSTRACT

In an embodiment of the present invention, a processor includes content storage logic to parse digital content into portions and to cause each portion to be stored into a corresponding page of a memory. The processor also includes protection logic to receive a write instruction having a destination address within the memory, and if the destination address is associated with a memory location stores a portion of the digital content, erase the page associated with the memory location. If the destination address is associated with another memory location that does not store any of the digital content, the protection logic is to permit execution of the write instruction. Other embodiments are described and claimed.

17 Claims, 10 Drawing Sheets

(51) Int. Cl.
*G06F 21/64* (2013.01)
*G06F 21/10* (2013.01)
*G06F 12/14* (2006.01)

(56) References Cited

U.S. PATENT DOCUMENTS

| | | | |
|---|---|---|---|
| 7,522,625 B2 | 4/2009 | Abe | |
| 7,797,463 B2 * | 9/2010 | Halleck | G06F 13/385 370/466 |
| 8,108,641 B2 * | 1/2012 | Goss | G06F 12/1408 711/163 |
| 8,812,804 B2 * | 8/2014 | Goss | G06F 12/1408 375/222 |
| 9,432,196 B2 * | 8/2016 | Goss | G06F 12/1408 |
| 9,438,424 B2 * | 9/2016 | Goss | G06F 12/1408 |
| 2006/0029102 A1 | 2/2006 | Abe | |
| 2006/0123184 A1 | 6/2006 | Mondal et al. | |
| 2008/0040608 A1 | 2/2008 | Li | |
| 2008/0168252 A1 | 7/2008 | Kunimune et al. | |
| 2009/0135898 A1 * | 5/2009 | Bauchot | H04L 67/04 375/240.01 |
| 2009/0300312 A1 | 12/2009 | Handschuh | |
| 2009/0327751 A1 | 12/2009 | Koifman et al. | |
| 2011/0162077 A1 | 6/2011 | Kadam | |
| 2016/0232105 A1 * | 8/2016 | Goss | G06F 21/575 |

OTHER PUBLICATIONS

Great Britain Intellectual Property Office, "Combined Search and Examination Report under Sections 17 and 18(3)," dated Sep. 4, 2014, in Great Britain application No. GB1404484.6.

Korean Intellectual Property Office, "Notice of Preliminary Rejection (English Translation)," in Korean Patent Application No. 10-2014-30652, Mailed on Mar. 25, 2015, 7 pages.

Great Britain Patent Office, Office Action mailed Apr. 27, 2015, in Great Britain Patent Application No. GB1404484.6.

Korea Patent Office, Office Action mailed Sep. 24, 2015 in Korean Patent Application No. 10-2014-0030652.

* cited by examiner

APPARATUS AND METHOD TO PROTECT DIGITAL CONTENT

This application is a continuation of U.S. patent application Ser. No. 13/833,119, filed Mar. 15, 2013, the content of which is hereby incorporated by reference.

TECHNICAL FIELD

The technical field is protection of digital content.

BACKGROUND

Encrypted digital content may be vulnerable to attack after decryption. For example, an overwrite of a portion of the decrypted digital content may constitute an attack. In an attack, a write instruction may be directed to overwrite a data type indicator that indicates whether subsequent data in a data string is metadata or payload data. Overwrite of the data type indicator, from an indication of payload data to an indication of metadata, may permit unauthorized access to the payload data. That is, because the data stored in locations subsequent to the data type indictor is re-labeled as metadata instead of payload data, and because metadata is not typically protected, the (incorrectly labeled) payload data may be subject to unauthorized access that may include theft of the payload data.

DETAILED DESCRIPTION

Figure 1:
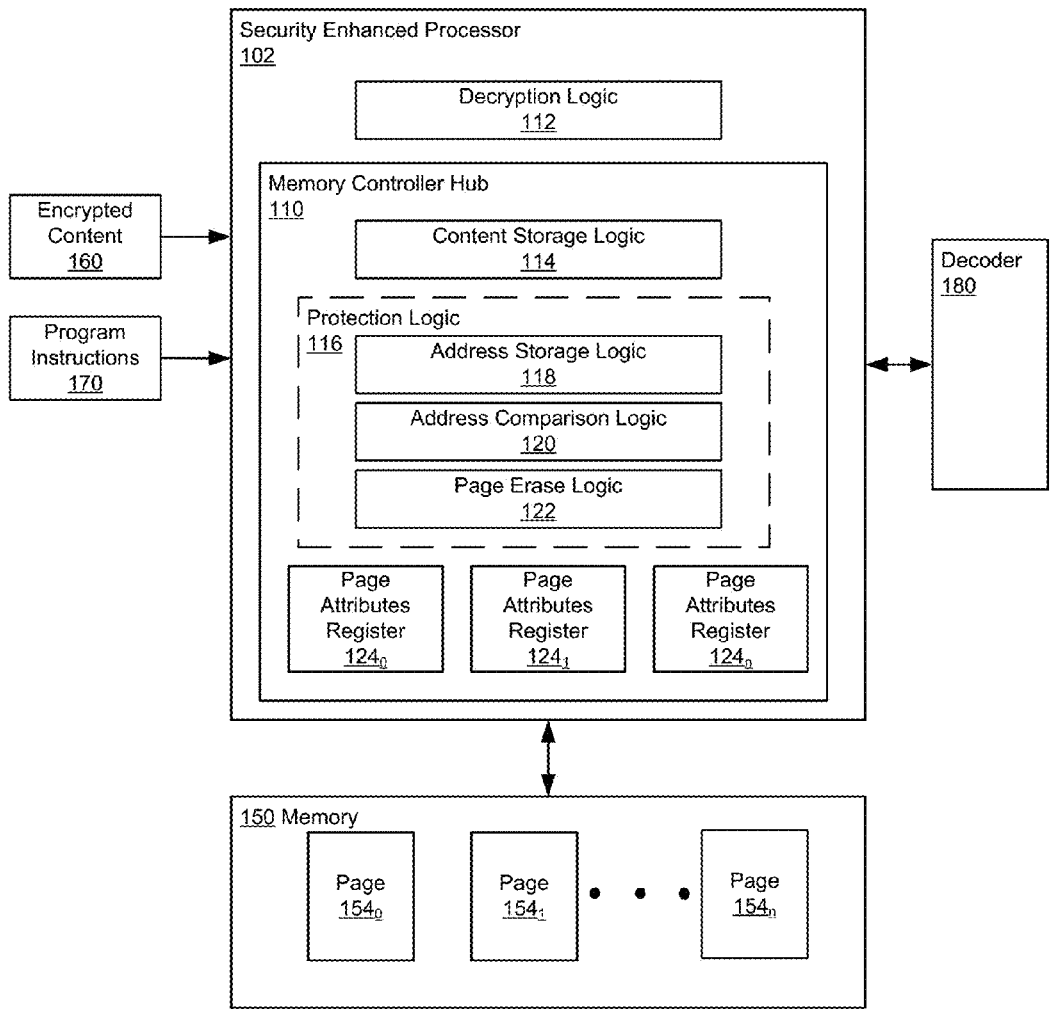
FIG. 1 is a block diagram of a portion of a system in accordance with an embodiment of the present invention.

A Security Enhanced Processor (SEP) may be used for secure content decryption, e.g., during a digital rights management (DRM) playback. Content may be decrypted into Isolated Memory Regions (IMR), a dedicated memory with access control mechanisms that may be built into associated hardware. IMR usage may prevent a host processor and malware from direct access to the decrypted content and may permit only selected subsystems (e.g., secure engines and a hardware decoder) to access the content stored in the IMR.

The decoder may need information about protected compressed content before the decoder can proceed to decode. For example, information about the size and location of slice metadata and actual protected content payload may be needed prior to the decoder decoding the compressed data. This opens up potential for security holes, e.g. "cut and paste attack" and "plain text overlay." For example, due to an attack when the data is parsed by the security engine, the entire decrypted content (including a protected PAYLOAD) may be provided to the host entity since the security engine mistakenly interprets the data as metadata based on modification of header information. Thus, the protected payload content could be stolen by a rogue application in the host.

Additionally, smaller packets that are not crypto-block aligned can arrive as plain-text material from the content provider, and the host can specify to the security engine that a packet does not need decryption. Therefore, the attacker may specify the "overwritten plain text part" as content not needing decryption. Note that security engine gets the location information (through an offset) from the host. Consequently the host can potentially send incorrect data this way to replace the actual data.

The attack scenario is possible for those schemes that can send irregular sized packets that are not aligned with actual video frames. Attack is also possible on hardware platforms whose decoders do not have ability to parse the entire streams themselves.

In an example, the attack may be directed to data that has already been decrypted into the IMR. In some platforms that support IMR, only the security engine has READ-WRITE access to IMRs, while other components, e.g., the decoder, are limited to READ-ONLY access. The security engine may lock the decrypted data so that it is only consumed by subsequent secure video path components to potentially eliminate "overwrite" attacks, and may reset (e.g., unlock) after consumption.

However, the security engine may not be aware of when a given data is consumed. Moreover, the IMR can hold multiple frames before each frame is consumed by the decoder. Hence, data writes, e.g., by the security engine, and data reads, e.g., by the decoder, can happen in an arbitrary fashion.

Typically, a frame is decrypted in its entirety before it is consumed, and multiple packets that constitute a frame are fed into the security engine in contiguous fashion. That is, a frame can be made up of multiple packets and these packets are decrypted contiguously into the IMR until the entire frame is decrypted into the IMR before packets of another frame are decrypted.

In an embodiment of the present invention, the IMR may provide a write-lock-reset facility, e.g., on a per page (or a per block) granularity. A page (or block) can have any granularity, per the system needs. The page can be configured at system start up. A running OFFSET of a last offset within a page written to may be maintained in a storage register associated with the page. The OFFSET may be updated on every write as follows: If the new offset is greater than the OFFSET, writes are permitted and the OFFSET may be updated to last location written to. In other words, the OFFSET is "locked" by the storage register. If writes are attempted to an offset within the page that is less than the OFFSET, then the OFFSET may be reset to zero (page UNLOCKED), the page may be erased, and new writes may be permitted to any offset within the page. After the writes, the OFFSET may be updated again.

An offset less than OFFSET may be attempted in two cases: 1) A new frame is being written/decrypted into the IMR. In this case, typically reset of the OFFSET and unlock of the page occurs. 2) A malware attempts to modify the existing data, in which case reset of the OFFSET and clearance (e.g., erasure) of the entire page can prevent the modification.

The page size can be made adjustable or configurable to fit the frame size. In one example, the entire frame may be cleared when an attack is detected, e.g., by comparison of the write offset to the OFFSET stored in the storage register.

In an embodiment, LOCK-and-RESET functionality can be implemented in firmware, or in hardware. For instance, the firmware running on the SEP can maintain page attributes (e.g., last written offset) and mimic LOCK-and-RESET functionality in software. Since SEP firmware is expected to run in a secure environment, the results are equally effective when implemented in hardware.

In various embodiments, protection of digital content may be provided by a processor, e.g., after the digital content has been decrypted. The processor may include content storage logic to parse the digital content into portions and to store each portion into a corresponding page of a memory. The processor may also include protection logic to receive a write instruction that includes a destination address, after the parsed digital content is stored, and if the destination address of the write instruction is to a memory location that stores a portion of the digital content, the protection logic may erase the page. If the destination address is associated with another memory location that does not store any of the digital content, the protection logic may execute the write instruction. Erasure of a page whose stored digital content is targeted by the write instruction may protect the erased digital content from being accessed by an unauthorized party.

Referring now to FIG. 1, shown is a block diagram of a portion of a system 100 in accordance with an embodiment of the present invention. As shown in FIG. 1, the system 100 may include various components, including a Security Enhanced Processor (SEP) 102.

The SEP 102 may include decryption logic 112 to decrypt incoming instructions. The SEP 102 may include a memory controller hub (MCH) 110 that may include content storage logic 114 and protection logic 116 that may include address storage logic, 118, address comparison logic 120, and page erase logic 122. The MCH 110 may also include one or more storage registers $124_0$, $124_1$, ..., $124_n$ to store an address offset, e.g., offset of a last written memory location within a corresponding page. Note that in FIG. 1 the SEP 102 is depicted at a high level and it is to be understood that a processor such as the SEP 102 may include many other features.

The system 100 may also include a memory 150, which may be an access-controlled memory including one or more isolated memory regions (IMR). In various embodiments, the memory 150 may be dynamic random access memory (DRAM), static random access memory (SRAM), or another type of storage memory. Access to the IMR may be determined by the MCH 110.

The memory 150 may be coupled, through the MCH 110, to a decoder 180. In an embodiment, the decoder 180 may be situated on a motherboard (not shown), e.g., along with the SEP 102 and the memory 150.

A portion of the memory 150 may be divided into one or more pages $154_0$, $154_1$ ..., $154_n$. In an embodiment, each page may have the same storage capacity, e.g., approximately 4 kilobytes (kB), or another storage capacity. In another embodiment, one or more of the pages $154_0$-$154_n$ may vary in storage capacity from other of the pages $154_0$-$154_n$.

In operation, the SEP 102 may receive encrypted digital content 160 and the decryption logic 112 may decrypt the encrypted digital content 160 to produce (unencrypted) digital content.

After the encrypted digital content has been decrypted, the content storage logic 114 in the MCH 110 may parse the digital content into one or more portions, e.g., each portion corresponding to one of the pages $154_0$, $154_1$, ..., $154_n$ of the memory 150. In some embodiments, the portions may be of equal size. In other embodiments, at least one portion may differ in size from other portions. After the decrypted content is parsed into portions, the portions may be stored by the content storage logic 114, with each portion stored into a corresponding page $154_0$, $154_1$, ..., $154_n$.

The address storage logic 118 may store an address of a last written memory location within each of the pages $154_0$, $154_1$, ..., $154_n$ into a corresponding storage register $124_0$, $124_1$, ..., $124_n$ as an offset from a starting address of the corresponding page.

The SEP 102 may receive program instructions 170. One of the program instructions may be a write instruction directed to a destination address that is within one of the pages $154_0$, $154_1$, ... $154_n$. The MCH 110 may determine which page $154_1$ includes the destination address of the write instruction. The address comparison logic 120 may compare a representation of the destination address of the write instruction with a representation of the address stored in a storage register $124_1$ corresponding to page $154_1$. For example, the address comparison logic 120 may determine that an offset corresponding to the destination address of the write instruction is less than or equal to the offset stored in the storage register $124_1$ that corresponds to the last written address of the page $154_1$. If executed, the write instruction would overwrite some of the stored data in page $154_1$. For example, the stored data that is targeted to be overwritten may include a data indicator type of the payload data. If the data indicator type were to be overwritten, the payload data might be mistakenly labeled as, e.g., metadata, which is typically not protected, and so the payload data might be subject to attack.

If it is determined that the destination address is less than or equal to the address represented by the offset stored in the storage register $124_i$, the address comparison logic 120 may trigger the page erase logic 122 to erase the page $154_i$. Erasure of the page $154_i$ can ensure that digital content stored in the page will not be subject to unauthorized access. In an embodiment, subsequent to erasure the page $154_i$ may be left blank.

If the destination address of the received write instruction is greater than the stored address in the storage register $124_i$, the write instruction may be executed, e.g., additional data may be written to the page $154_i$, e.g., to an unwritten portion of the page $154_i$.

Contents of the pages $154_0$, $154_1$, ..., $154_n$ can be provided to the decoder 180 via the MCH 110 for decoding, and the decoded data may be output, e.g., as video, audio, or other proprietary content. In an attack scenario, a page $154_i$ may be erased and decoded as noise and may be output as noise that may serve to indicate that the digital content 162 has been attacked.

Figure 2:
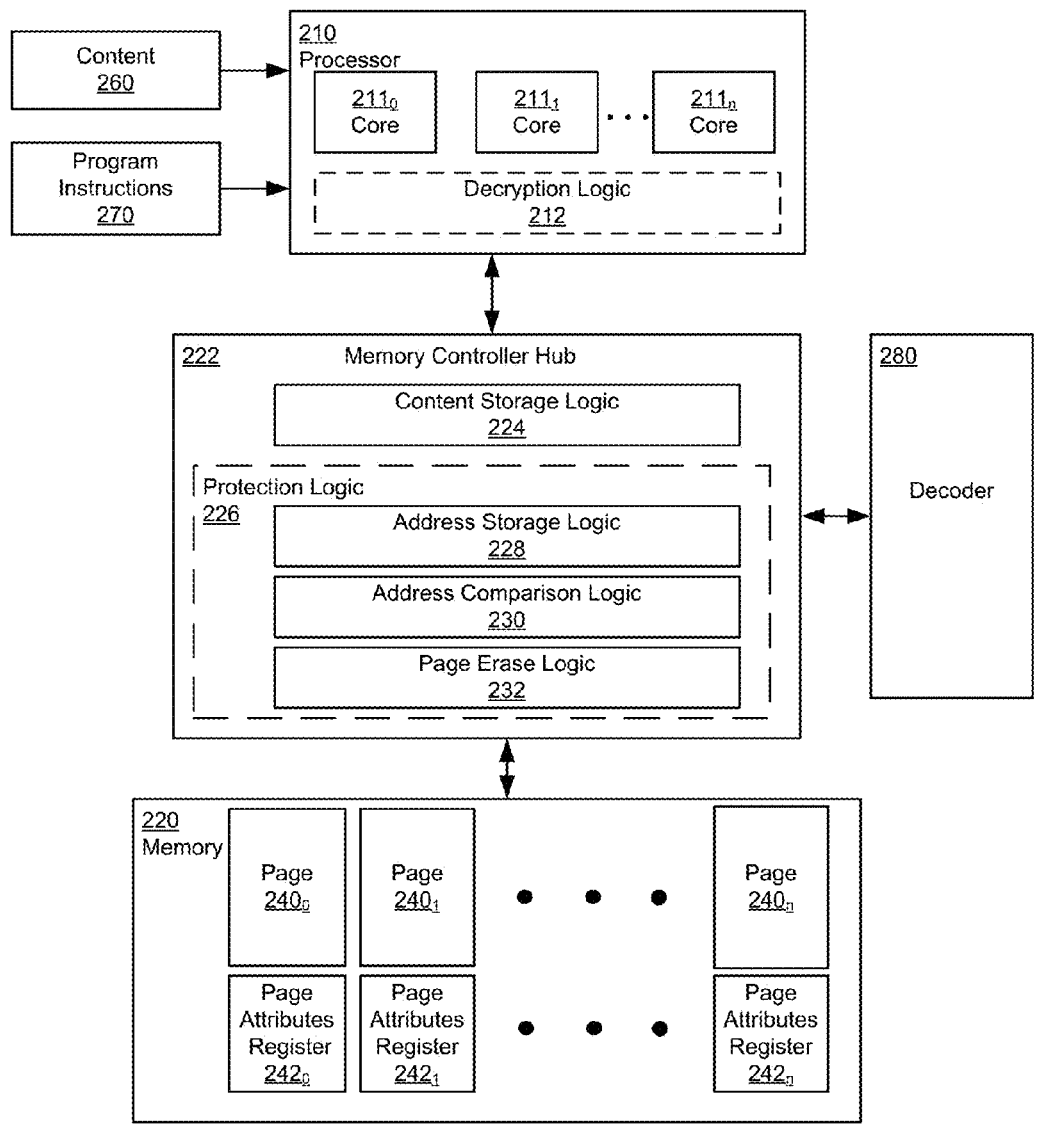
FIG. 2 is a block diagram of a portion of another system in accordance with an embodiment of the present invention.

Turning now to FIG. 2, shown is a block diagram of a portion of a system 200 in accordance with another embodiment of the present invention. As shown in FIG. 2, the system 200 may include various components, including a processor 210 that may be coupled to a memory controller hub (MCH) 222. The processor 210 may be a multi-core processor that may include cores $211_0$, $211_1$, ..., $211_n$. The processor 210 may also include decryption logic 212 to decrypt encrypted digital content.

The MCH 222 may be coupled to a memory 220, such as a dynamic random access memory (DRAM), static random access memory (SRAM), or another type of memory. The MCH 222 may include content storage logic 224 and protection logic 226 that may include address storage logic 228, address comparison logic 230, and page erase logic 232. The MCH 222 may also include one or more storage registers $242_0$, $242_1$, . . . , $242_n$, each to store an address of a page in the memory 220, e.g., as an offset from an initial address of the corresponding page.

The memory 220 may be divided into one or more pages $240_0$, $240_1$, . . . , $240n$. In an embodiment, each page may be of the same capacity, e.g., approximately 4 kilobytes (kB). In another embodiment, some of the pages may differ in capacity from other pages within the memory 220.

The memory 220 may be coupled, through the MCH 222, to a decoder 280 that may be configured decode data (e.g., payload data) stored in the memory 220, e.g., after the data has been stored in the pages $240_0$, $240_1$, . . . , $240_n$.

In operation, the processor 210 may receive encrypted digital content 260, and the decryption logic 212 may decrypt the encrypted digital content 260 to produce (unencrypted) digital content. The content storage logic 224 within the memory management controller 222 may parse the digital content into one or more portions, e.g., each portion corresponding to one of the pages $240_0$, $240_1$, . . . , $240_n$. In some embodiments, the portions may be of equal size. In other embodiments, at least one portion may differ in size from at least one of the other portions, with each portion sized to a corresponding one of the pages $240_0$, $240_1$, . . . , $240_n$. The content storage logic 224 may store each portion into the corresponding page $240_0$, $240_1$, . . . , $240_n$.

The address storage logic 228 within the protection logic 226 of the memory management controller 222 may store a corresponding address of a last written-to memory location within each of the pages $240_0$, $240_1$, . . . , $240_n$ into a corresponding storage register $242_0$, $242_1$, . . . , $242_n$. In an embodiment, each address may be stored as a corresponding offset from an initial address of the corresponding page $240_0$, $240_1$, . . . , $240_n$.

The processor 210 may receive program instructions 270. One of the program instructions 270 may be a write instruction directed to a destination address that is within one of the pages $240_0$, $240_1$, . . . , $240_n$. For example, the write instruction may have a destination address within page $240_0$.

The address comparison logic 230 may compare the destination address of the write instruction to the address stored in the storage register of the corresponding page that includes the destination address, e.g., storage register $242_0$. For instance, an offset corresponding to the destination address may be determined and compared with the last written offset stored in the storage register $242_0$. If the address comparison logic 230 determines that the destination address is less than or equal to the address represented by the offset stored in the storage register $240_0$, then the write instruction, if executed, would overwrite some of the stored data in page $240_0$. Consequently, the address comparison logic 230 may trigger the page erase logic 232 to erase the page $240_0$. Erasure of the page $240_0$ can ensure that digital content previously stored in the page will not be subject to unauthorized access that might occur, e.g., through an overwrite of a data type indicator that before the overwrite indicates that payload data follows.

If the address comparison logic 230 determines that the destination address of the write instruction is subsequent to the last written address, as determined by comparison of the destination address to a stored last written address in a storage register (e.g., by comparison of the stored offset to an offset corresponding to the destination address), the write may be executed to the destination address of the write instruction. Because the destination address has not been previously written, no data will be overwritten as a result of execution of the write instruction.

Figure 3:
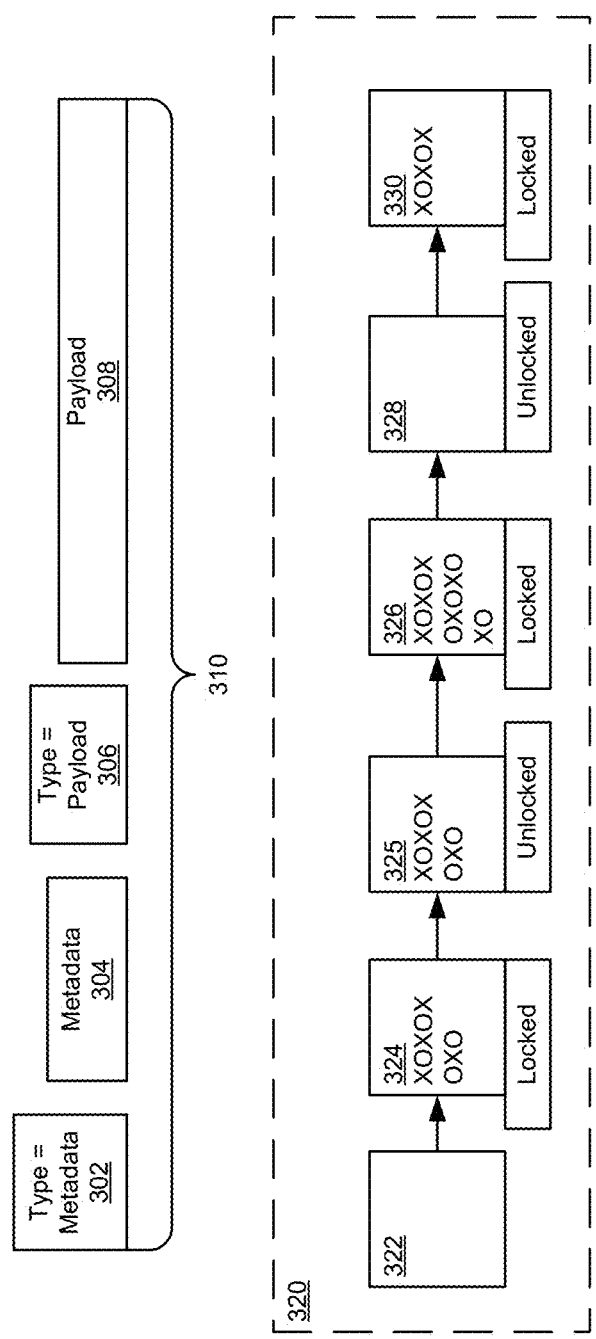
FIG. 3 is a block diagram showing digital content written in a memory, according to an embodiment of the invention.

Turning to FIG. 3, shown is a block diagram of digital content to be stored in a memory, according to an embodiment of the invention. Decrypted digital content 310 may include a first data type indicator 302, first data 304, a second data type indicator 306, and second data 308. In an embodiment, the first data type indicator 302 may indicate that the first data 304 is metadata, and the second data type indicator 306 may indicate that the second data 308 is payload data.

Memory 320 may include a clear unlocked page 322. Content storage logic within a memory management controller (not shown) may write a portion of the digital content 310 to the page 322, producing page 324 that contains a portion of the digital content 310. After the write to the page 322 is complete ("first write"), a last written offset, which corresponds to a last address of data written the page 324, may be stored in a corresponding storage register (not shown). After completion of the first write, page 324 may be locked to prevent another write to the page 324.

Subsequently, if an additional write instruction to the page 324 is received, an offset corresponding to the destination address of the additional write instruction may be compared with the last written offset stored in the storage register corresponding to the page 324. If the destination address of the additional write instruction is subsequent to the end of the previous write in page 324 (e.g., destination address offset of the additional write instruction is subsequent to the stored last written offset) the locked page 324 may be unlocked (e.g., unlocked page 325) and the additional write instruction may be executed to write additional data to produce page 326, which may be locked after the additional write instruction is executed. The stored last written offset may be updated in the corresponding storage register to reflect the additional data stored in the page 326.

If the comparison of the offset associated with the destination address of the additional write instruction to the last written offset indicates that the additional write instruction is directed to a page address that has already been written to, contents of the page may be erased (flushed) to produce (clear) page 328. The last written offset may be reset to zero and stored in the storage register corresponding to the page 328. Erasure of the stored digital content in the page 326 can ensure that the previously stored digital content will not be corrupted.

The erased page may be unlocked to enable a subsequent write to page 328 that results in page 330, which may again be locked after the subsequent write is executed. The stored offset may be updated in the corresponding storage register of the page 330 to reflect occupied portions of the page due to the subsequent write.

Figure 4:
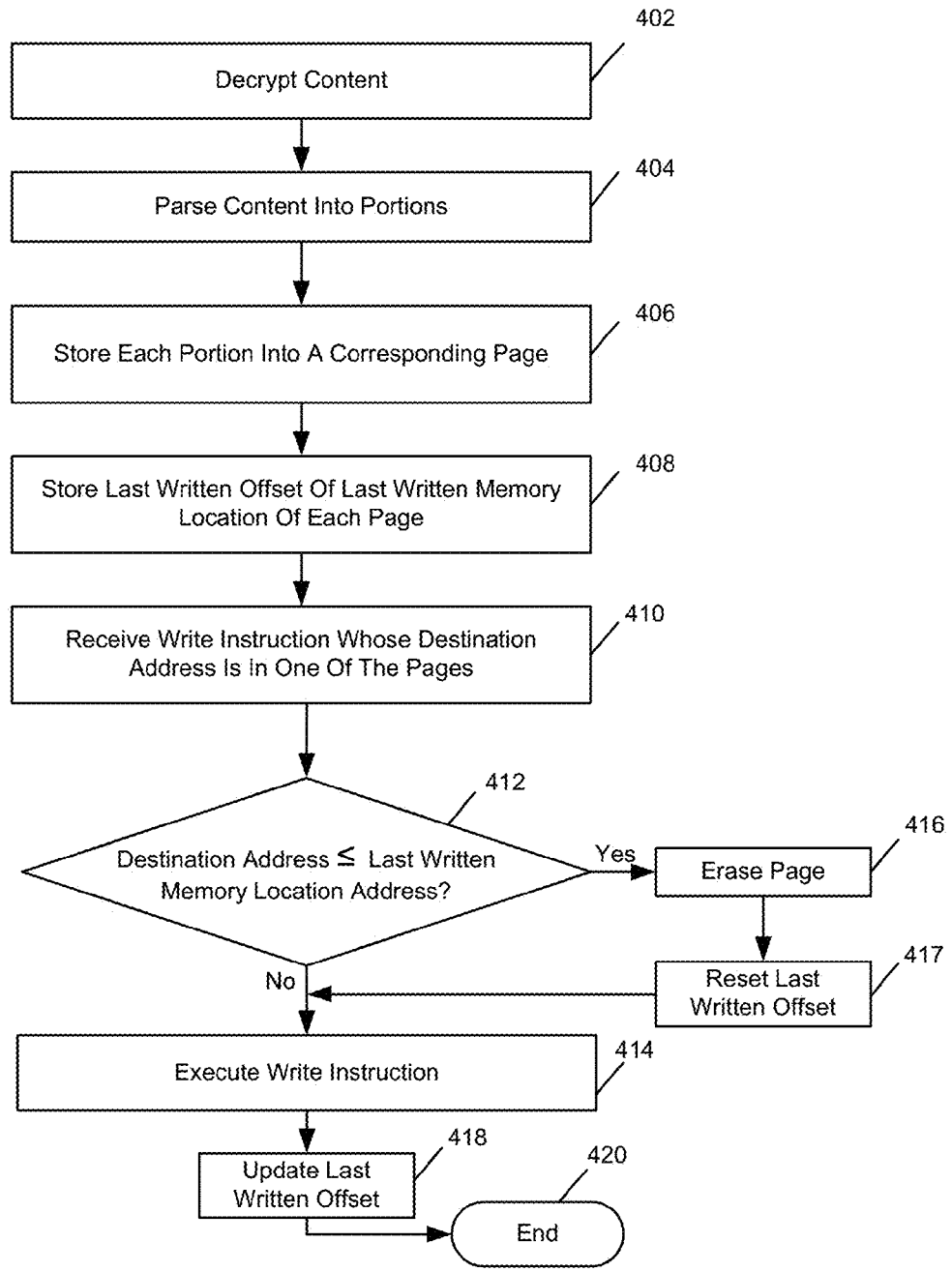
FIG. 4 is a flow diagram of a method of protecting digital content, according to an embodiment of the present invention.

Turning to FIG. 4, shown is a flow diagram of a method of protecting digital content, according to an embodiment of the present invention. Beginning at block 402, incoming encrypted digital content may be decrypted by, e.g., a Security Enhanced Processor, or by a multi-core processor.

Continuing to block 404, the decrypted digital content may be parsed into portions, e.g., by a memory controller hub. For example, each portion may be sized to be stored in a page of e.g., isolated memory regions (IMR) or system memory (e.g., DRAM), and in one embodiment each page may have a same storage capacity (e.g., 4 kB), or in another embodiment the storage capacity of some of the pages may differ from the storage capacity of other pages. Some of the pages may be partially filled after the digital content is stored.

Advancing to block 406, each portion may be stored into a corresponding page within the IMR or system memory. Moving to block 408, a last written offset (corresponding to an address within a page) of a last written memory location within each page, may be stored in a corresponding register that may be located, e.g., in the memory controller hub, or in memory, such as the system memory.

Proceeding to block 410, a write instruction may be received (by the processor) that has a destination address within one of the pages to which a digital content portion is stored. Continuing to decision diamond 412, a determination may be made by the processor of whether the destination address of the write instruction is less than or equal to the last written memory location address within the corresponding page, e.g., by comparison with the stored last written offset. If the destination address is greater than the last written memory location address, advancing to block 414 the write instruction may be executed, e.g., the write instruction causes additional data to be written to a blank memory location within the corresponding page. Advancing to block 418, the stored last written offset of the corresponding page may be updated to reflect the additional stored data, and continuing to block 420, the method ends. If the destination address is less than or equal to the last written memory location address, at block 416 the page may be erased. Moving to block 417, the last written offset stored in the corresponding storage register may be reset, to, e.g., zero to reflect the erased page. Returning to block 414, the write instruction may be executed. Advancing to block 418, the stored last written offset of the corresponding page may be updated to reflect the additional stored data, and continuing to block 420 the method ends.

The method of FIG. 4 can be performed by hardware software, firmware, or combinations thereof. While shown at a high level in the embodiment of FIG. 4, it is to be understood that the scope of the present invention is not so limited.

Figure 5:
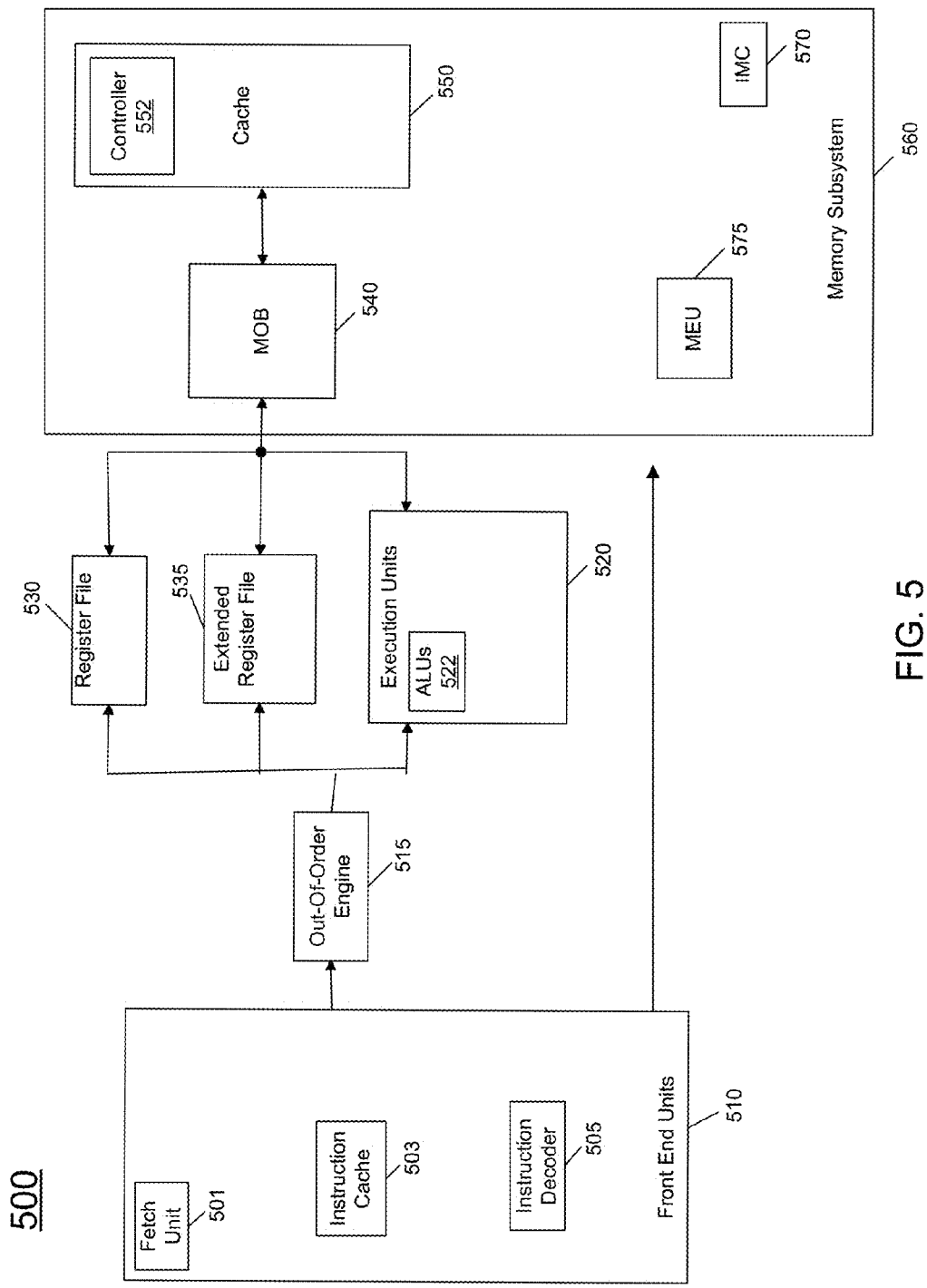
FIG. 5 is a block diagram of a processor core in accordance with an embodiment of the present invention.

Embodiments can be implemented in many different systems. For example, embodiments can be realized in a processor such as a multicore processor. Referring now to FIG. 5, shown is a block diagram of a processor core in accordance with one embodiment of the present invention. As shown in FIG. 5, processor core 500 may be one core of a multicore processor, and is shown as a multi-stage pipelined out-of-order processor.

As shown in FIG. 5, core 500 includes front end units 510, which may be used to fetch instructions to be executed and prepare them for use later in the processor. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535 such as by using renaming logic of the engine. Register file 530 may include separate register files for integer and floating point operations. Extended register file 535 may provide storage for vector-sized units, e.g., 256 or 512 bits per register.

Various resources may be present in execution units 520, including, for example, various integer, floating point, and single instruction multiple data (SIMD) logic units, among other specialized hardware. For example, such execution units may include one or more arithmetic logic units (ALUs) 522. Of course other execution units such as multiply-accumulate units and so forth may further be present. Results may be provided to a retirement logic, which may be implemented within a memory subsystem 560 of the processor. Various processor structures including execution units and front end logic, for example, may be coupled to a memory subsystem 560. This memory subsystem may provide an interface between processor structures and further portions of a memory hierarchy, e.g., an on or off-chip cache and a system memory. As seen the subsystem has various components including a memory order buffer (MOB) 540. More specifically, MOB 540 may include various arrays and logic to receive information associated with instructions that are executed. This information is then examined by MOB 540 to determine whether the instructions can be validly retired and result data committed to the architectural state of the processor, or whether one or more exceptions occurred that prevent a proper retirement of the instructions. Of course, MOB 540 may handle other operations associated with retirement.

As shown in FIG. 5, MOB 540 is coupled to a cache 550 which, in one embodiment may be a low level cache (e.g., an L1 cache). Memory subsystem 560 also may include an integrated memory controller 570 to provide for communication with a system memory (not shown for ease of illustration in FIG. 5). Memory subsystem 560 may further include a memory execution unit (MEU) 575 that handles various operations to initiate memory requests and handle return of data from memory. For example, MEU 575 may effect parsing of digital content into portions, storage of the portions into corresponding pages, storage of a last written offset of each page, and determination of whether a write instruction is directed to a memory location that includes digital content within a page. If the write instruction is directed to a memory location storing digital content within a page, the MEU 575 may erase the page that includes the destination memory location, as described herein with regard to embodiments of the invention.

From memory subsystem 560, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of a so-called x86 instruction set architecture (ISA) architecture, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
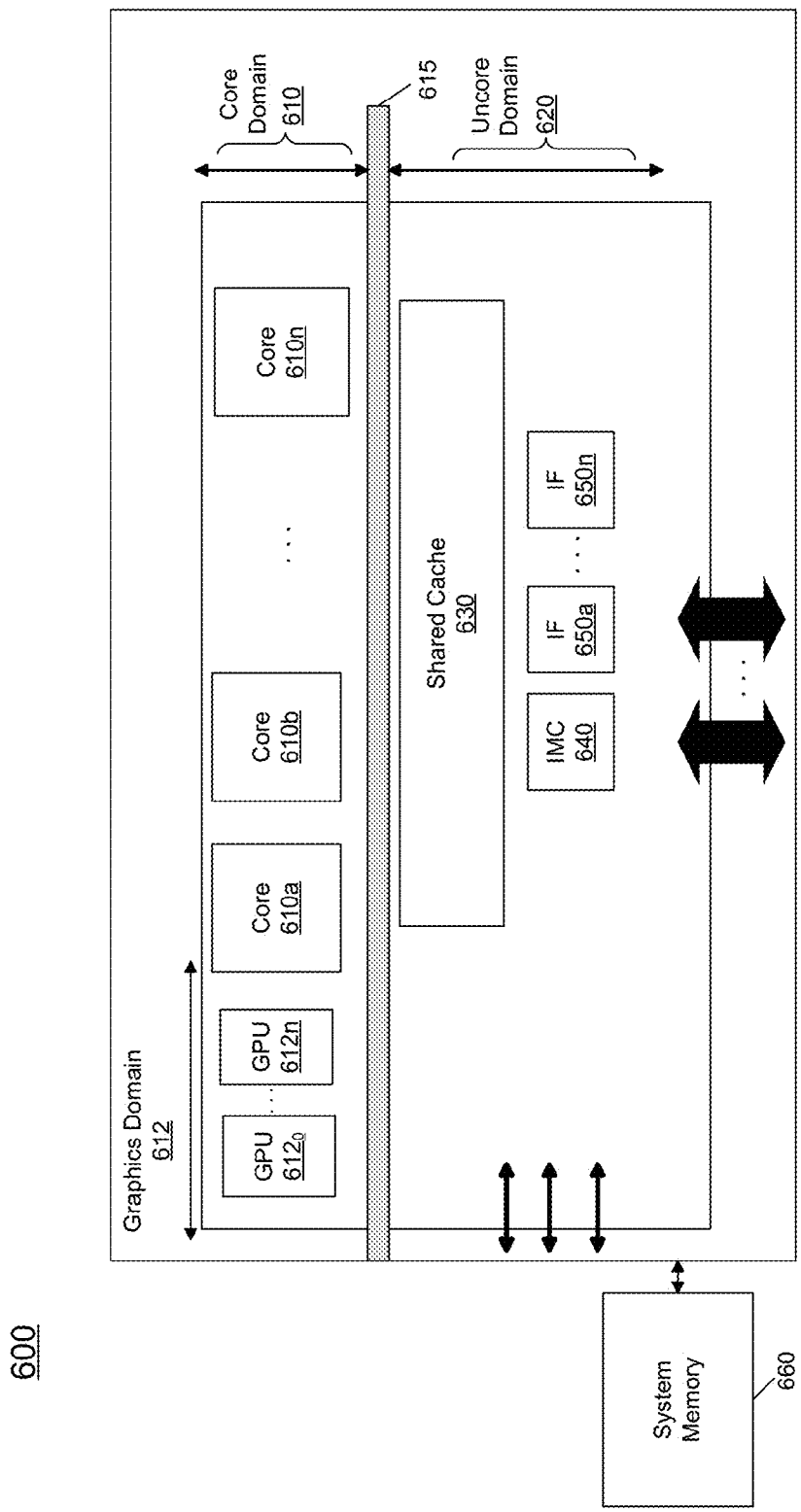
FIG. 6 is a block diagram of a processor in accordance with an embodiment of the present invention.

Referring now to FIG. 6, shown is a block diagram of a processor in accordance with an embodiment of the present invention. As shown in FIG. 6, processor 600 may be a multicore processor including a plurality of cores $610_a$-$610_n$ in a core domain 610. In one embodiment, each core may include a memory execution unit (not shown) that includes content storage logic, address storage logic, address comparison logic, and page erase logic, as described herein in embodiments of the invention. As further shown in FIG. 6, one or more graphics processing units (GPUs) $612_0$-$612_n$ may be present in a graphics domain 612. These various compute elements may be coupled via an interconnect 615 to a system agent or uncore 620 that includes various components. As seen, the uncore 620 may include a shared cache 630 which may be a last level cache.

In addition, the uncore may include an integrated memory controller 640 and various interfaces 650. In some embodiments of the present invention, the memory controller 640 may parse decrypted digital content into portions, store the portions in corresponding pages of a system memory 660, and store a last written offset of each page. The memory controller 640 may determine whether a write instruction has a destination address of a memory location to which some of the digital content is stored within one of the pages, and if so, may erase the page, according to embodiments of the present invention.

With further reference to FIG. 6, processor 600 may communicate with the system memory 660, e.g., via a memory bus. In addition, by interfaces 650, connection can be made to various off-chip components such as peripheral devices, mass storage and so forth. While shown with this particular implementation in the embodiment of FIG. 6, the scope of the present invention is not limited in this regard.

Figure 7:
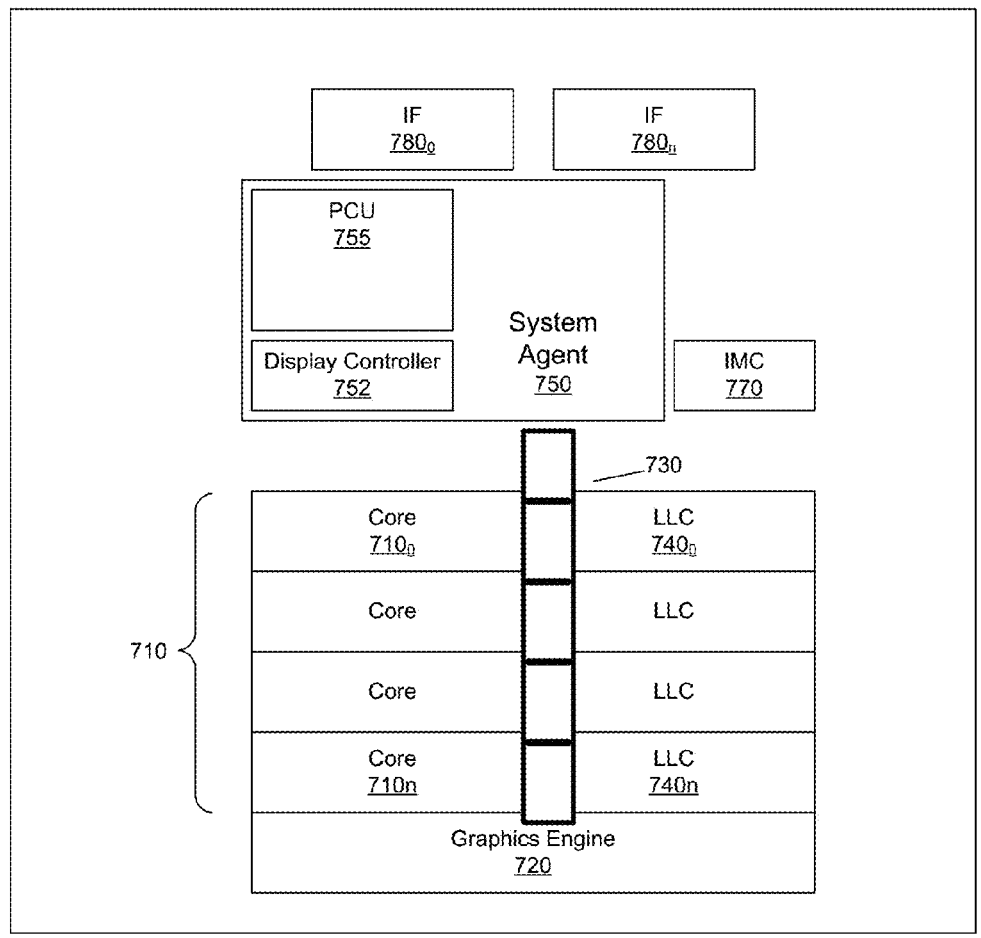
FIG. 7 is a block diagram of a multi-domain processor in accordance with an embodiment of the present invention.

Referring now to FIG. 7, shown is a block diagram of a multi-domain processor in accordance with another embodiment of the present invention. As shown in the embodiment of FIG. 7, processor 700 includes multiple domains. Specifically, a core domain 710 can include a plurality of cores $710_0$-$710_n$, a graphics domain 720 can include one or more graphics engines, and a system agent domain 750 may further be present.

Note that while only shown with three domains, understand the scope of the present invention is not limited in this regard and additional domains can be present in other embodiments. For example, multiple core domains may be present, each including at least one core.

In general, each core 710 may further include low level caches in addition to various execution units and additional processing elements. The various cores may be coupled to each other and to a shared cache memory formed of a plurality of units of a last level cache (LLC) $740_0$-$740_n$. In various embodiments, LLC 740 may be shared amongst the cores and the graphics engine, as well as various media processing circuitry. As seen, a ring interconnect 730 thus couples the cores together, and provides interconnection between the cores, graphics domain 720 and system agent circuitry 750.

In the embodiment of FIG. 7, system agent domain 750 may include display controller 752 which may provide control of and an interface to an associated display. As further seen, system agent domain 750 may include a power control unit 755.

As further seen in FIG. 7, processor 700 can further include an integrated memory controller (IMC) 770 that can provide for an interface to a system memory (not shown), such as a dynamic random access memory (DRAM). The IMC 770 may parse decrypted digital content into portions, store the portions in corresponding pages of the system memory, and store a last written offset of each page, in accordance with embodiments of the present invention. The IMC 770 may determine whether a write instruction has a destination address of a memory location to which some of the digital content is stored within one of the pages (e.g., through comparison of a representation of the destination address with the last written offset of the page), and if so, may erase the page, according to embodiments of the present invention.

Multiple interfaces $780_0$-$780_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with a Intel® Quick Path Interconnect (QPI) protocol may also be provided. Although shown at this high level in the embodiment of FIG. 7, understand the scope of the present invention is not limited in this regard.

Figure 8:
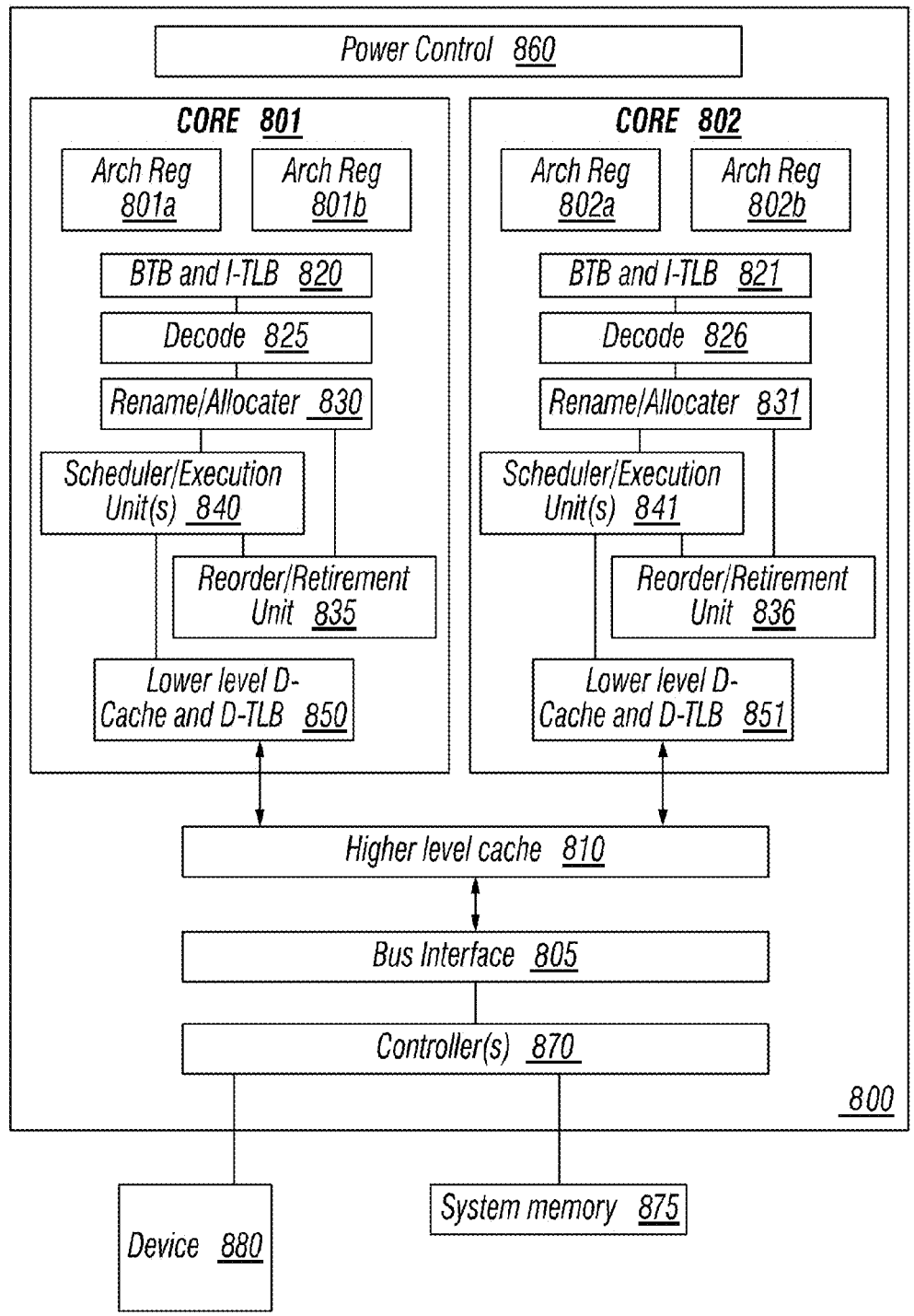
FIG. 8 is an illustration of an embodiment of a processor including multiple cores in accordance with an embodiment of the present invention.

Referring to FIG. 8, an embodiment of a processor including multiple cores is illustrated. Processor 800 includes any processor or processing device, such as a microprocessor, an embedded processor, a digital signal processor (DSP), a network processor, a handheld processor, an application processor, a co-processor, a system on a chip (SOC), or other device to execute code. Processor 800, in one embodiment, includes at least two cores—cores 801 and 802, which may include asymmetric cores or symmetric cores (the illustrated embodiment). However, processor 800 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 800, as illustrated in FIG. 8, includes two cores, cores 801 and 802. Here, cores 801 and 802 are considered symmetric cores, i.e., cores with the same configurations, functional units, and/or logic. In another embodiment, core 801 includes an out-of-order processor core, while core 802 includes an in-order processor core. However, cores 801 and 802 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 801 are described in further detail below, as the units in core 802 operate in a similar manner.

As depicted, core 801 includes two hardware threads 801a and 801b, which may also be referred to as hardware thread slots 801a and 801b. Therefore, software entities, such as an operating system, in one embodiment potentially view processor 800 as four separate processors, i.e., four logical processors or processing elements capable of executing four software threads concurrently. As alluded to above, a first thread is associated with architecture state registers 801a, a second thread is associated with architecture state registers 801b, a third thread may be associated with architecture state registers 802a, and a fourth thread may be associated with architecture state registers 802b. Here, each of the architecture state registers (801a, 801b, 802a, and 802b) may be referred to as processing elements, thread slots, or thread units, as described above. As illustrated, architecture state registers 801a are replicated in architecture state registers 801b, so individual architecture states/contexts are capable of being stored for logical processor 801a and logical processor 801b. In core 801, other smaller resources, such as instruction pointers and renaming logic in allocator and renamer block 830 may also be replicated for threads 801a and 801b. Some resources, such as re-order buffers in reorder/retirement unit 835, ILTB 820, load/store buffers, and queues may be shared through partitioning. Other resources, such as general purpose internal registers, page-table base register(s), low-level data-cache and data-TLB 815, execution unit(s) 840, and portions of out-of-order unit 835 are potentially fully shared.

Processor 800 often includes other resources, which may be fully shared, shared through partitioning, or dedicated by/to processing elements. In FIG. 8, an embodiment of a purely exemplary processor with illustrative logical units/resources of a processor is illustrated. Note that a processor may include, or omit, any of these functional units, as well as include any other known functional units, logic, or firmware not depicted. As illustrated, core 801 includes a simplified, representative out-of-order (OOO) processor core. But an in-order processor may be utilized in different embodiments. The OOO core includes a branch target buffer 820 to predict branches to be executed/taken and an instruction-translation buffer (I-TLB) 820 to store address translation entries for instructions.

Core 801 further includes decode module 825 coupled to fetch unit 820 to decode fetched elements. Fetch logic, in one embodiment, includes individual sequencers associated with thread slots 801a, 801b, respectively. Usually core 801 is associated with a first ISA, which defines/specifies instructions executable on processor 800. Often machine code instructions that are part of the first ISA include a portion of the instruction (referred to as an opcode), which references/specifies an instruction or operation to be performed. Decode logic 825 includes circuitry that recognizes these instructions from their opcodes and passes the decoded instructions on in the pipeline for processing as defined by the first ISA. For example, decoders 825, in one embodiment, include logic designed or adapted to recognize specific instructions, such as transactional instruction. As a result of the recognition by decoders 825, the architecture or core 801 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 830 includes an allocator to reserve resources, such as register files to write instruction processing results. However, threads 801a and 801b are potentially capable of out-of-order execution, where allocator and renamer block 830 also reserves other resources, such as reorder buffers to track instruction results. Unit 830 may also include a register renamer to rename program/instruction reference registers to other registers internal to processor 800. Reorder/retirement unit 835 includes components, such as the reorder buffers mentioned above, load buffers, and store buffers, to support out-of-order execution and later in-order retirement of instructions executed out-of-order.

Scheduler and execution unit(s) block 840, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 850 are coupled to execution unit(s) 840. The data cache is to store recently used/operated on elements, such as data operands, which are potentially held in memory coherency states. The D-TLB is to store recent virtual/linear to physical address translations.

Here, cores 801 and 802 share access to higher-level or further-out cache 810, which is to cache recently fetched elements. Note that higher-level or further-out refers to cache levels increasing or getting further away from the execution unit(s). In one embodiment, higher-level cache 810 is a last-level data cache—last cache in the memory hierarchy on processor 800—such as a second or third level data cache. However, higher level cache 810 is not so limited, as it may be associated with or includes an instruction cache. A trace cache—a type of instruction cache—instead may be coupled after decoder 825 to store recently decoded traces.

In the depicted configuration, processor 800 also includes, controller 870. The controller 870 may parse decrypted digital content into portions and store the portions in corresponding pages of a system memory 875 in accordance with embodiments of the present invention. The controller 870 may determine whether a write instruction has a destination address of a memory location to which some of the digital content is stored within one of the pages (e.g., through comparison of a representation of the destination address with a last written offset of the page), and if so, may erase the page, according to embodiments of the present invention.

In this scenario, bus interface 805 is to communicate with devices external to processor 800, such as the system memory 875, a chipset (often including a memory controller hub to connect to memory 875 and an I/O controller hub to connect peripheral devices), a memory controller hub, a northbridge, or other integrated circuit (not shown). And in this scenario, bus 805 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 875 may be dedicated to processor 800 or shared with other devices in a system. Common examples of types of memory 875 include DRAM, SRAM, non-volatile memory (NV memory), and other known storage devices. Note that device 880 may include a graphic accelerator, processor or card coupled to a memory controller hub, data storage coupled to an I/O controller hub, a wireless transceiver, a flash device, an audio controller, a network controller, or other known device.

Note that in the depicted embodiment, the controller 870 is illustrated as part of processor 800. Recently, as more logic and devices are being integrated on a single die, such as SOC, each of these devices may be incorporated on processor 800. For example in one embodiment, memory controller hub 870 is on the same package and/or die with processor 800. Here, a portion of the core (an on-core portion) includes the controller 870 for interfacing with other devices such as memory 875 or a graphics device 880. The configuration, including an interconnect and controllers for interfacing with such devices, is often referred to as an on-core (or un-core configuration). As an example, bus interface 805 includes a ring interconnect with a memory controller for interfacing with memory 875 and a graphics controller for interfacing with graphics processor 880. Yet, in the SOC environment, even more devices, such as the network interface, co-processors, memory 875, graphics processor 880, and any other known computer devices/interface may be integrated on a single die or integrated circuit to provide small form factor with high functionality and low power consumption.

Figure 9:
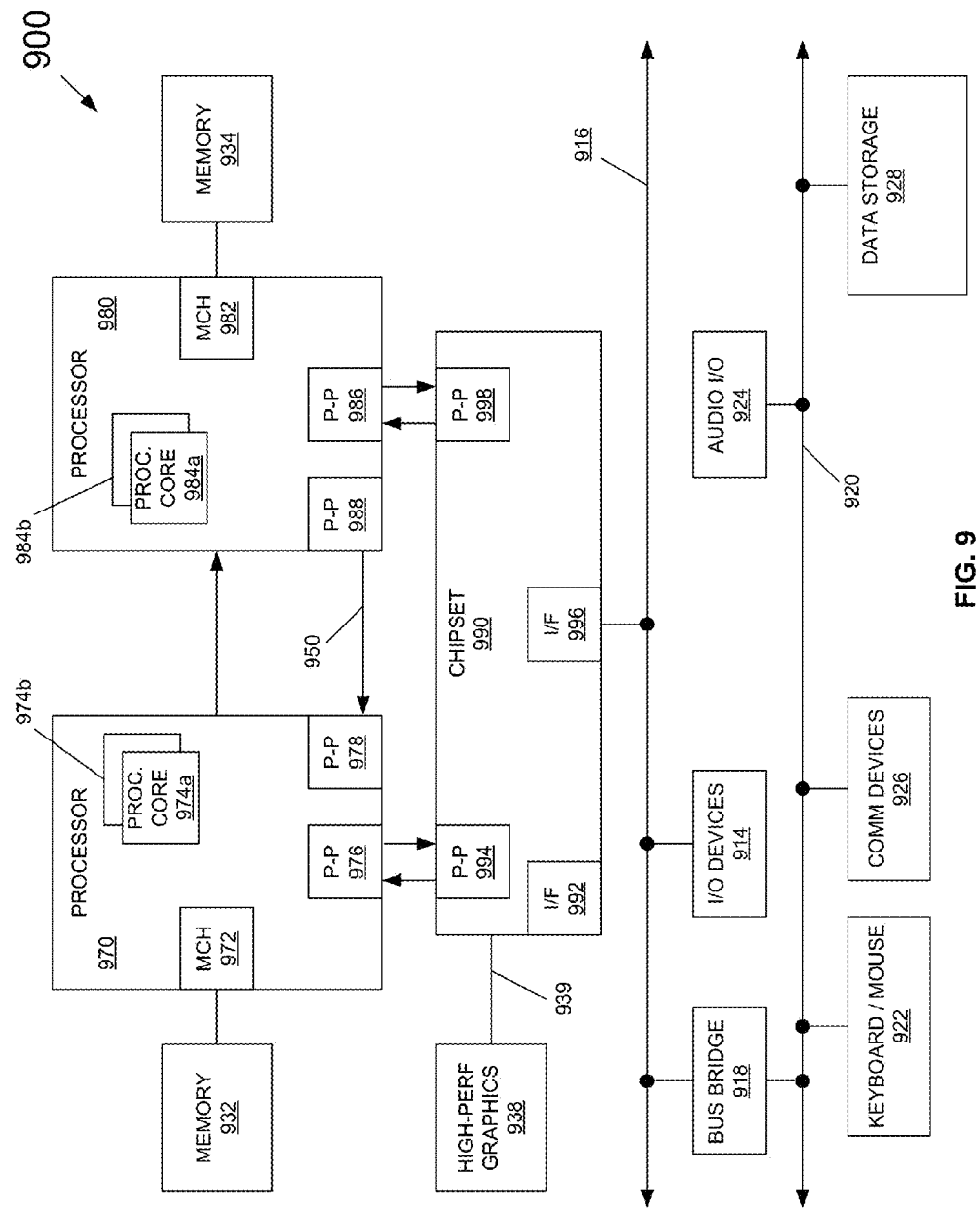
FIG. 9 is a block diagram of a system in accordance with an embodiment of the present invention.

Embodiments may be implemented in many different system types. Referring now to FIG. 9, shown is a block diagram of a system in accordance with an embodiment of the present invention. As shown in FIG. 9, multiprocessor system 900 is a point-to-point interconnect system, and includes a first processor 970 and a second processor 980 coupled via a point-to-point interconnect 950. As shown in FIG. 9, each of processors 970 and 980 may be multicore processors, including first and second processor cores (i.e., processor cores 974a and 974b and processor cores 984a and 984b), although potentially many more cores may be present in the processors. Each of the processors may include a respective cache. First processor 970 and second processor 980 may be coupled to a chipset 990 via P-P interconnects 952 and 954, respectively. As shown in FIG. 9, chipset 990 includes P-P interfaces 994 and 998.

Still referring to FIG. 9, first processor 970 further includes a memory controller hub (MCH) 972 and point-to-point (P-P) interfaces 976 and 978. Similarly, second processor 980 includes a MCH 982 and P-P interfaces 986 and 988. As shown in FIG. 9, MCH's 972 and 982 couple the processors to respective memories, namely a memory 932 and a memory 934, which may be portions of system memory (e.g., DRAM) locally attached to the respective processors. Each of the MCH's 972 and 982 may parse decrypted digital content into portions and store the portions in corresponding pages of the corresponding memory (932 or 934), in accordance with embodiments of the present invention. The MCHs 972 and 982 may determine whether a write instruction has a destination address of a memory location to which some of the digital content is stored within one of the pages (e.g., through comparison of a representation of the destination address with a last written offset of the page), and if so, may erase the page, according to embodiments of the present invention.

Furthermore, chipset 990 includes an interface 992 to couple chipset 990 with a high performance graphics engine 938 by a P-P interconnect 939. In turn, chipset 990 may be coupled to a first bus 916 via an interface 996. As shown in FIG. 9, various input/output (I/O) devices 914 may be coupled to first bus 916, along with a bus bridge 918 which couples first bus 916 to a second bus 920. Various devices may be coupled to second bus 920 including, for example, a keyboard/mouse 922, communication devices 926 and a data storage unit 928 such as a disk drive or other mass storage device, in one embodiment. Further, an audio I/O 924 may be coupled to second bus 920. Embodiments can be incorporated into other types of systems including mobile devices such as a smart cellular telephone, Ultrabook™, tablet computer, netbook, or so forth.

That is, in other embodiments, a processor architecture may include emulation features such that the processor can execute instructions of a first ISA, referred to as a source ISA, where the architecture is according to a second ISA, referred to as a target ISA. In general, software, including both the OS and application programs, is compiled to the source ISA, and hardware implements the target ISA designed specifically for a given hardware implementation with special performance and/or energy efficiency features.

Figure 10:
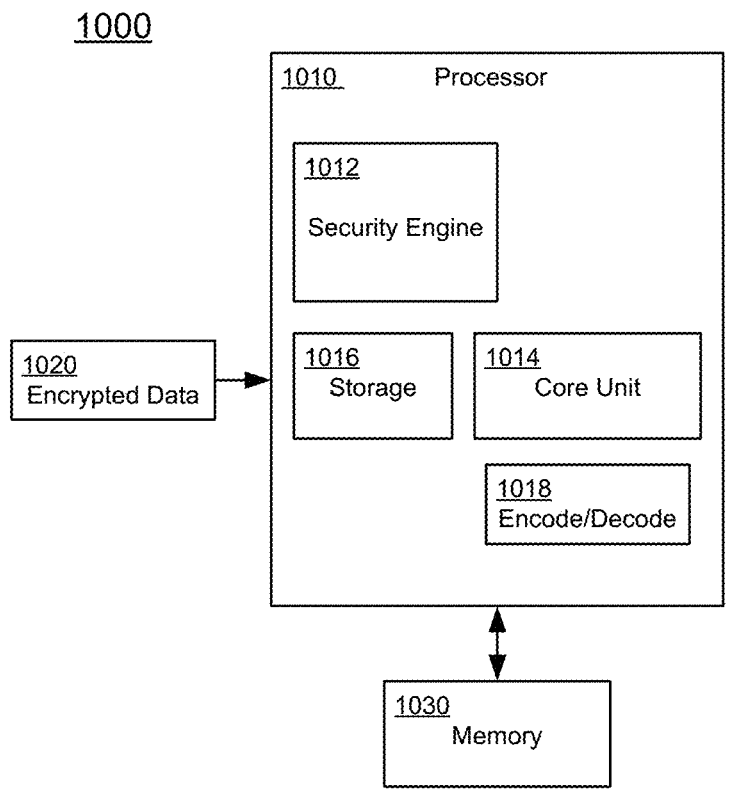
FIG. 10 is a block diagram of a system in accordance with another embodiment of the present invention.

Referring to FIG. 10, a block diagram of a system 1000 is shown in accordance with another embodiment of the present invention. The system 1000 includes a processor 1010 and memory 1030. The processor 1010 may be a system on a chip (SOC) and may include a security engine 1012, a core unit 1014 that may include one or more cores, cache memory and an interface to communicate with other SOC components, storage 1016, and encode/decode logic 1018.

In operation, the security engine 1012 may decrypt incoming encrypted data 1020. The security engine 1012 may parse the (unencrypted) data into portions and may store the portions in corresponding pages within the memory 1030. The security engine 1012 may store a last written offset corresponding to a last written address of each page, in a corresponding storage register. In one embodiment, the storage registers may be located within the processor 1010. In another embodiment the storage registers may be located within the memory 1030.

The Core unit 1014 may receive a write instruction whose destination address lies in one of the pages. The security engine 1012 may perform a comparison of the last written offset to a write offset associated with the destination address of the write instruction. The security engine 1012 may lock or unlock write access to the page based on the comparison of the last written offset to the write offset. For example, if the write offset is larger than the last written offset, the security engine 1012 may unlock write access to the corresponding page, and if the write offset is less than or equal to the last written offset, the security engine 1012 may lock write access to the corresponding page, reset the last written offset to zero, and erase (e.g., flush) contents of the corresponding page.

Embodiments may be used in many different types of systems. For example, in one embodiment a communication device can be arranged to perform the various methods and techniques described herein. Embodiments can be incorporated into other types of systems including mobile devices such as a smart cellular telephone, tablet computer, netbook, Ultrabook™, or so forth. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

The following examples pertain to further embodiments. In an embodiment, a processor includes content storage logic to parse digital content into portions and cause each portion to be stored into a corresponding page of a memory. The processor also includes protection logic to receive a write instruction having a destination address within the memory. If the destination address is associated with a memory location that stores some of the digital content, the protection logic is to erase the page associated with the memory location, and if the destination address is associated with another memory location that does not store any of the digital content, the protection logic is to permit execution of the write instruction.

In another embodiment, the processor includes decryption logic to decrypt encrypted digital content and to output the digital content to the content storage logic.

In an embodiment, each page has a same page size.

In an embodiment, the processor includes one or more storages, each storage to store a representation of a last written address of a corresponding page. In an embodiment, the representation of the last written address includes an offset from an initial address of the corresponding page.

The protection logic may compare a representation of the destination address to the representation of the last written address stored in one of the storages to determine whether the memory storage location associated with the destination address stores some of the digital content and if the destination address is greater than the last written address, the protection logic may determine that the memory storage location associated with the destination address does not store any of the digital content and the protection logic may permit execution of the write instruction.

If the destination address lies between a beginning of a particular page and the last written address, the protection logic may erase contents of the particular page and may reset the representation of the last written address.

In an embodiment, a system includes a processor, dynamic random access memory (DRAM) coupled to the processor, and a memory controller coupled to the DRAM to write digital content into a plurality of pages in the DRAM. Responsive to receipt by the processor of a write instruction having a destination address of a memory storage location in one of the pages, the memory controller may, if the memory storage location does not store any of the digital content, execute the write instruction, and if the memory storage location stores some of the digital content, erase the page.

In an embodiment, the memory controller includes a plurality of registers, each register to store a last written offset corresponding to a last written address of a corresponding page.

In an embodiment, the memory controller may compare a destination offset corresponding to the destination address to the offset stored in one of the registers to determine whether the memory storage location associated with the destination address stores some of the digital content. If the destination offset lies between a beginning of a particular page and the last written offset, the memory controller may determine that the memory storage location associated with the destination address stores some of the digital content.

If the memory storage location stores some of the digital content, the memory controller may reset the last written offset after the page is erased. If the destination offset is greater than the last written offset, the memory controller may determine that the memory storage location associated with the destination address does not store any of the digital content.

In an embodiment, a method includes parsing digital content into portions, storing each portion into a corresponding page of a memory, comparing a destination address of a write instruction to a last written address of one of the pages to determine whether a corresponding memory location stores some of the digital content, erasing at least one of the pages if the corresponding memory location stores some of the digital content, and executing the write instruction if the corresponding memory location does not store any of the digital content.

The method may further include decrypting the digital content prior to parsing the digital content.

Comparing may include determining that a first page includes the destination address and if the destination address is between a first written address of the first page and the last written address of the first page, determining that the corresponding memory location stores some of the digital content.

The method may include, if the destination address is not between the first written address of the first page and the last written address of the first page, determining that the corresponding memory location does not store any of the digital content. The method may further include updating the corresponding last written address in response to execution of the write instruction.

In an embodiment, at least one machine readable medium includes one or more instructions that when executed on a processor configure the processor to carry out one or more of the aforementioned embodiments of the method.

In an embodiment, an apparatus may be configured to perform one or more of the aforementioned embodiments of the method.

In an embodiment, an apparatus includes means for performing the method of any of the aforementioned embodiments of the method.

In an embodiment, a processor may include one or more cores and protection logic to determine whether to unlock write access to a first page of a memory responsive to a comparison of a write offset that is associated with a write instruction to the first page to a last written offset that is stored in a first storage and that is associated with a last written memory location of the first page. The protection logic may unlock the write access to the first page and permit execution of the write instruction responsive to the comparison that indicates that the write offset exceeds the last written offset.

The processor may include update logic to replace the last written offset in the first storage with the write offset responsive to the execution of the write instruction.

The protection logic may erase the first page responsive to the comparison that indicates that the write offset is less than or equal to the last written offset.

The processor may include update logic to reset the last written offset in the first storage after erasure of the page.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
    a hardware core comprising:
        execution logic to execute instructions;
        decryption logic to receive encrypted digital content and decrypt the encrypted digital content to generate digital content;
        a plurality of storage registers to store an offset value from a starting address of a page of a memory, wherein the offset value corresponds to a last written address within the corresponding page, the offset value to be locked by the corresponding storage register;
        content storage logic to parse the digital content into portions, store the portions into corresponding pages of the memory and store a respective offset value in a corresponding one of the plurality of storage registers; and
        protection logic, responsive to receipt of a destination address specified by a write instruction, to:
            determine whether a location in a first page of the memory corresponding to the destination address stores some of the digital content; and
            if the location in the first page stores at least some of the digital content erase the first page, and if the location in the first page does not store any of the digital content, permit execution of the write instruction and update the offset value responsive to the execution of the write instruction.

2. The processor of claim 1, wherein each page has a same page size.

3. The processor of claim 1, wherein the processor further comprises a memory controller.

4. The processor of claim 1, wherein the first page is to be locked after the digital content is written into the first page.

5. The processor of claim 1, wherein the first page is to store the digital content comprising a first data type indicator to indicate presence of metadata in a first portion of the digital content and a second data type indicator to indicate presence of payload data in a second portion of the digital content.

6. The processor of claim 1, wherein the digital content is to include at least one of video content and audio content.

7. The processor of claim 1, wherein the digital content is to include proprietary content.

8. The processor of claim 1, wherein the protection logic is to reset the offset value within the corresponding storage register responsive to erasure of the first page.

9. A system comprising:
    a processor having at least one core to execute instructions and decryption logic to receive encrypted digital content and decrypt the encrypted digital content into digital content;
    a memory coupled to the processor; and
    a memory controller coupled to the memory, the memory controller to write the digital content into a plurality of pages in the memory, the memory controller comprising:
        a plurality of registers to store a last written offset corresponding to a last written address of a corresponding page;
        wherein responsive to receipt by the processor of a write instruction having a destination address in a first page, the memory controller is to:
            determine whether the destination address stores some of the digital content based on a comparison of a representation of the destination address to the last written offset of the corresponding register;
            if the destination address does not store any of the digital content, write information of the write instruction to the first page; and
            if the destination address stores at least some of the digital content, erase the first page, wherein the processor further comprises a decoder to decode contents of the first page, wherein when the first page has been erased, the decoder is to output a representation of the first page as noise.

10. The system of claim 9, wherein if the representation of the destination address lies between an initial offset value that corresponds to a first memory storage location of the first page and the last written offset, the memory controller is to determine that the destination address stores the at least some of the digital content.

11. The system of claim 9, wherein if the representation of the destination address is greater than the last written offset, the memory controller is to determine that the destination address does not store any of the digital content.

12. The system of claim 9, wherein the digital content to be stored in the first page includes at least one of video content and audio content.

13. The system of claim 9, wherein the processor comprises the memory controller.

14. A non-transitory machine-readable medium having stored thereon instructions, which if performed by a machine cause the machine to perform a method comprising:
    decrypting, by decryption logic of a processor, digital content, and thereafter parsing the digital content into portions;
    storing the portions of the digital content into corresponding pages of a memory and storing into a corresponding storage register of a plurality of storage registers a respective last written offset value that corresponds to a respective last written address of the corresponding page, to lock the last written offset value; and
    comparing a representation of a destination address of a write instruction to a last written offset value stored in the corresponding storage register, to determine whether the destination address stores some of the digital content, and if so, erasing a page corresponding to the corresponding storage register.

15. The non-transitory machine-readable medium of claim 14, wherein the method further comprises, if the destination address does not store any of the digital content, storing information associated with the write instruction to the page.

16. The non-transitory machine-readable medium of claim 15, wherein the method further comprises resetting the respective last written offset value within the corresponding storage register responsive to execution of the write instruction.

17. The non-transitory machine-readable medium of claim 14, wherein when the page is erased, the method further comprises decoding the page as noise and outputting the noise.

* * * * *